US009612859B2

(12) United States Patent
Chandrasekaran et al.

(10) Patent No.: US 9,612,859 B2
(45) Date of Patent: Apr. 4, 2017

(54) COMPARING STATES OF A VIRTUAL MACHINE

(71) Applicant: VMware,Inc., Palo Alto, CA (US)

(72) Inventors: Rahul Chandrasekaran, San Jose, CA (US); Ravi Kant Cherukupalli, San Ramon, CA (US); Uttam Gupta, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/336,698

(22) Filed: Jul. 21, 2014

(65) Prior Publication Data

US 2016/0019082 A1    Jan. 21, 2016

(51) Int. Cl.
*G06F 9/455* (2006.01)
*G06F 17/30* (2006.01)

(52) U.S. Cl.
CPC .... *G06F 9/45558* (2013.01); *G06F 17/30088* (2013.01); *G06F 2009/45591* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 8,135,930 B1 | 3/2012 | Mattox et al. | |
| 8,364,639 B1 * | 1/2013 | Koryakina et al. | 707/639 |
| 8,566,821 B2 | 10/2013 | Robinson et al. | |
| 8,656,386 B1 | 2/2014 | Baimetov et al. | |
| 8,725,689 B1 | 5/2014 | Koryakin et al. | |
| 8,959,055 B1 | 2/2015 | Koryakina et al. | |
| 9,038,062 B2 | 5/2015 | Fitzgerald et al. | |
| 2008/0077634 A1 | 3/2008 | Quakenbush | |
| 2008/0134175 A1 | 6/2008 | Fitzgerald et al. | |
| 2010/0138830 A1 | 6/2010 | Astete et al. | |
| 2011/0010515 A1 | 1/2011 | Ranade | |
| 2011/0225582 A1 | 9/2011 | Iikura et al. | |
| 2011/0246922 A1 | 10/2011 | Koenig et al. | |
| 2012/0005673 A1 | 1/2012 | Cervantes et al. | |
| 2012/0131480 A1 * | 5/2012 | Kalmbach et al. | 715/763 |
| 2013/0007710 A1 | 1/2013 | Vedula et al. | |
| 2013/0247032 A1 | 9/2013 | Bhargava et al. | |
| 2013/0274006 A1 | 10/2013 | Hudlow et al. | |
| 2013/0275376 A1 | 10/2013 | Hudlow et al. | |
| 2013/0332920 A1 | 12/2013 | Laor | |
| 2013/0346976 A1 | 12/2013 | Robinson et al. | |
| 2014/0040890 A1 | 2/2014 | Novak et al. | |
| 2014/0115285 A1 | 4/2014 | Arcese et al. | |
| 2014/0149695 A1 | 5/2014 | Zaslavsky et al. | |
| 2014/0149696 A1 | 5/2014 | Frenkel et al. | |
| 2014/0189429 A1 | 7/2014 | Gill et al. | |
| 2014/0189685 A1 | 7/2014 | Kripalani | |
| 2014/0282514 A1 | 9/2014 | Carson et al. | |
| 2015/0074536 A1 | 3/2015 | Varadharajan et al. | |
| 2015/0100957 A1 | 4/2015 | Botzer | |

(Continued)

*Primary Examiner* — Timothy A Mudrick

(57) ABSTRACT

In a computer-implemented method for comparing states of a virtual machine, a plurality of selectable states including a current state of a virtual machine and at least one snapshot of the virtual machine are presented for selection, wherein the at least one snapshot includes a state of the virtual machine at a previous state. Responsive to a selection of at least two states of the plurality of selectable states, a comparison tool for comparing information between the at least two states of the virtual machine is presented.

12 Claims, 11 Drawing Sheets

(56) References Cited

U.S. PATENT DOCUMENTS

2015/0127618 A1    5/2015   Alberti et al.
2015/0212893 A1    7/2015   Pawar et al.

* cited by examiner

1000

```
┌─────────────────────────────────────────────────────────────┐
│ COMPARE INFORMATION BETWEEN TWO STATES OF A VIRTUAL MACHINE,│
│ WHEREIN THE TWO STATES INCLUDE A CURRENT STATE OF THE VIRTUAL│
│ MACHINE AND PREVIOUS STATE OF THE VIRTUAL MACHINE, WHEREIN THE│
│ PREVIOUS STATE OF THE VIRTUAL MACHINE IS A SNAPSHOT OF THE VIRTUAL│
│                          MACHINE.                           │
│                           1010                              │
└─────────────────────────────────────────────────────────────┘
                              │
                              ▼
┌─────────────────────────────────────────────────────────────┐
│ IDENTIFY WHICH INFORMATION IS DIFFERENT BETWEEN THE TWO STATES.│
│                           1020                              │
└─────────────────────────────────────────────────────────────┘
                              │
                              ▼
┌─────────────────────────────────────────────────────────────┐
│   PRESENT THE INFORMATION THAT IS DIFFERENT BETWEEN THE TWO │
│   STATES, WHEREIN THE INFORMATION THAT IS DIFFERENT IS SELECTABLE│
│           FOR COPYING BETWEEN THE TWO STATES.               │
│                           1030                              │
└─────────────────────────────────────────────────────────────┘
                              │
                              ▼
┌─────────────────────────────────────────────────────────────┐
│              CAPTURE A SNAPSHOT OF THE CURRENT STATE.       │
│                           1040                              │
└─────────────────────────────────────────────────────────────┘
                              │
                              ▼
┌─────────────────────────────────────────────────────────────┐
│ RESPONSIVE TO A SELECTION OF SELECTED INFORMATION FOR COPYING│
│ BETWEEN THE TWO STATES, MODIFY THE CURRENT STATE TO INCLUDE THE│
│                   SELECTED INFORMATION.                     │
│                           1050                              │
│  ┌───────────────────────────────────────────────────────┐  │
│  │ PROVIDED THE SELECTED INFORMATION DOES HAVE ASSOCIATED│  │
│  │ INFORMATION IN THE CURRENT STATE, REPLACE THE ASSOCIATED│
│  │ INFORMATION IN THE CURRENT STATE WITH THE SELECTED    │  │
│  │                   INFORMATION                         │  │
│  │                      1060                             │  │
│  └───────────────────────────────────────────────────────┘  │
│                                                             │
│  ┌───────────────────────────────────────────────────────┐  │
│  │ PROVIDED THE SELECTED INFORMATION DOES NOT HAVE ASSOCIATED│
│  │ INFORMATION IN THE CURRENT STATE, ADD THE SELECTED    │  │
│  │           INFORMATION TO THE CURRENT STATE            │  │
│  │                      1070                             │  │
│  └───────────────────────────────────────────────────────┘  │
└─────────────────────────────────────────────────────────────┘
```

FIG. 10

COMPARING STATES OF A VIRTUAL MACHINE

CROSS-REFERENCE TO RELATED APPLICATIONS

This application is related to co-pending U.S. patent application Ser. No. 14/336,583, filed on Jul. 21, 2014, entitled "VIEWING A SNAPSHOT OF A VIRTUAL MACHINE," by Chandrasekaran et al., and assigned to the assignee of the present application.

This application is related to co-pending U.S. patent application Ser. No. 14/336,782, filed on Jul. 21, 2014, entitled "MODIFYING A STATE OF A VIRTUAL MACHINE," by Chandrasekaran et al., and assigned to the assignee of the present application.

BACKGROUND

Virtualization enables physical computing devices to run multiple and/or different operating systems and applications on the same computing device. A virtual machine is one implementation of virtualization, where a virtual machine is a virtual computer system that acts like a physical computer system by running an operating system and applications. Virtual machines include specification and configuration files and are backed by physical hardware resources.

Snapshots are used in a virtualization environment to preserve the state of a virtual machine at a particular time. For example, snapshots are useful when testing or debugging a virtual machine, allowing the administrator to revert to the same previous state and make changes to that state.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 10 is a flow diagram of a method for modifying a state of a virtual machine, in accordance with various embodiments.

DESCRIPTION OF EMBODIMENTS

Figure 1:
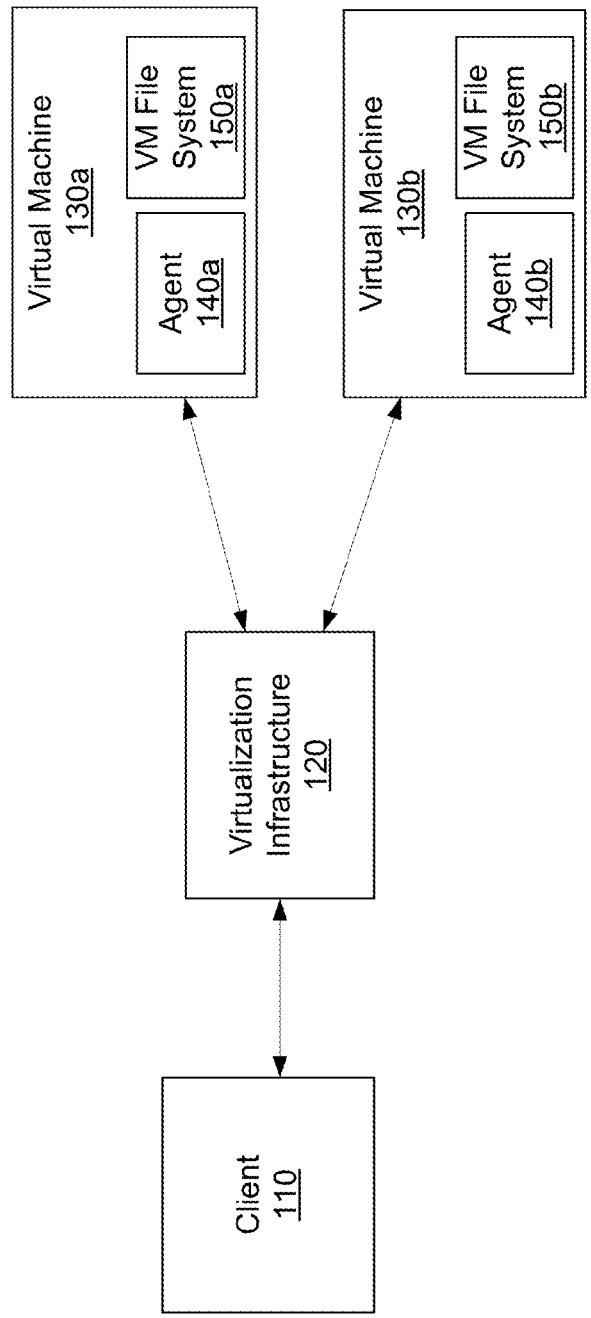
FIG. 1 is an example block diagram of a virtualization environment upon which embodiments described herein may be practiced.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "accessing," "discovering," "viewing," "presenting," "deploying," "creating," "comparing," "identifying," "modifying," "replacing," "adding," "capturing," "copying," "executing," or the like, often refer to the actions and processes of an electronic computing device or system, such as a host computer system, a virtualization manager, a virtualization workstation, a virtualization management server or a virtual machine (VM), among others, of a virtualization infrastructure. In some embodiments, the electronic computing device/system may be a portion of a distributed computing system. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

OVERVIEW OF DISCUSSION

In accordance with various described embodiments, a snapshot of a virtual machine may be viewed. In a virtualization environment, snapshots for a virtual machine may be captured. For purposes of the instant description of embodiments, a snapshot is a file, or a collection of files, that preserves the state and data of a virtual machine at a specific point in time. For example, the snapshot may include, without limitation:

the virtual machine's power state (e.g., powered on, powered off, suspended);

the files that make up the virtual machine, including disks, memory, and other devices, such as virtual network interface cards;

the files and memory state of a virtual machine's guest operating system; and/or the settings and configuration of a virtual machine and its virtual hardware.

In various embodiments, virtual machines provide several operations for creating and managing snapshots and snapshot chains. These operations enable the creation of snapshots, reversion to any snapshot in the chain, and to remove snapshots. Typically, when a snapshot is created for the first time for a virtual machine, the first child disk is created from the parent disk. Successive snapshots generate new child disks from the last child disk on the chain. It should be appreciated that the parents-child relationship can change if there are multiple branches in the snapshot chain.

Currently, there is no mechanism for accessing a prior state of the virtual machine without losing the current state of the virtual machine. In other words, when a virtual machine is reverted to a snapshot, the execution state of the virtual machine is changed to the state of the snapshot, losing the current state. There is no existing option to view a previous state of a virtual machine when the current state of the virtual machine is active and running.

Embodiments described herein relate to methods and systems for viewing a snapshot of virtual machine. The described embodiments present snapshots of a virtual machine for selection during the operation of the virtual machine. Responsive to a selection of a snapshot, the snapshot is deployed in second virtual machine concurrent to the operation of the virtual machine in the current state. Accordingly, the selected prior state of the virtual machine is deployed without having to close the current state of the virtual machine.

Moreover, there is currently no mechanism for comparing the whole machine state of two states of the same virtual machine. For purposes of the instant description of embodiments, the machine state refers to, without limitation:

running processes;
installed applications;
file systems;
registry entries (for applicable operating systems);
environment variables;
user management;
open network ports; and
virtual machine properties.

Embodiments described herein relate to methods and systems for comparing states of a virtual machine. For example, comparing the machine state of two different states (e.g., snapshots) of the virtual machine is useful in debugging operations. By providing an option to compare between two states, a user can identify the changes between a current state and an earlier state (e.g., a previous known stable state).

For example, consider a developer deploying and running an application in a virtual machine. Every time the application version is updated or configuration changes are made, a snapshot is created. After updating the application to a specific version, the application experiences performance degradation. Embodiments described herein allow the developer to debug the application by comparing the current state (e.g., degraded state) of the virtual machine to a previous state (e.g., stable state) of the virtual machine. The developer will be able to compare changes in the registry, processes that are actively running, files added and/or modified, users added and/or modified, changes in environment variables, and network ports.

Furthermore, currently there is no mechanism for copying files or settings between states of a virtual machine. Continuing the example from above, a developer is able to compare between states of a virtual machine to identify differences between the states. If the developer identifies a source of the performance degradation, e.g., a missing file, in order to correct the performance degradation using conventional techniques, the virtual machine must be reverted to the prior state (e.g., the previous known stable state) of the snapshot.

Embodiments described herein relate to methods and systems for modifying a state of a virtual machine. In various embodiments, files and/or settings may be copied between states of a virtual machine. For example, a user may copy a file from a previous snapshot to a current state, creating a hybrid state from multiple snapshots. For instance, if a developer comparing the file systems between two states of a virtual machine identifies a missing file in the current state, the developer is provided with an option to copy the missing file into the current state Herein various systems, methods and techniques for viewing a snapshot of a virtual machine, for comparing states of a virtual machine, and for modifying a state of a virtual machine are described. Discussion begins with a description of an example virtualization environment upon which embodiments described herein may be practiced. Discussion continues with a description of systems for viewing a snapshot of a virtual machine, a description of systems for comparing states of a virtual machine, and a description of systems for modifying a state of a virtual machine. Operation of various components of the described systems are further described in conjunction with description of various methods associated with viewing a snapshot of a virtual machine, for comparing states of a virtual machine, and for modifying a state of a virtual machine.

EXAMPLE VIRTUALIZATION ENVIRONMENT

FIG. 1 is an example block diagram of a virtualization environment 100 upon which embodiments described herein may be practiced. As depicted, virtualization environment 100 includes client 110, virtualization infrastructure 120, and virtual machines 130a and 130b. It should be appreciated that the components of virtualization environment 100 may be included within a single computing device or may be distributed across a distributed computing system. It should also be appreciated that virtualization environment 100 may include any number of virtualization machines, and that the number of components shown in FIG. 1 is for illustrative purposes only.

Client 110 is a computing device, either physical or virtual or a combination thereof, that provides access to virtualization infrastructure 120. For example, and without limitation, client 110 may be a personal computer, a tablet, a smartphone, a thin client device, a virtual machine, a virtualization management server, or a virtualization server. In various embodiments, client 110 includes a graphical user interface for accessing and communicating with virtualization infrastructure 120. It should be appreciated that in accordance with various embodiments, client 110 may be a component of virtualization infrastructure 120.

Virtualization infrastructure 120 enables the creation and management of multiple virtual machines, including the ability to create and access snapshots of the virtual machines. In one embodiment, virtualization infrastructure includes a virtualization workstation that enables the creation and management of multiple virtual machines on a single physical computing device. An example virtualization workstation is VMware Workstation. In another embodiment, virtualization infrastructure 120 includes a virtualization server that enables the creation and management of multiple virtual machines. In one embodiment, virtualization infrastructure 120 includes a virtualization management server that manages the virtualization server. An example virtualization management server is the VMware vCenter server and examples of virtualization servers are VMware ESX and VMware ESXi.

As shown, virtualization environment 100 includes virtual machines 130a and 130b, where each virtual machine includes an associated file system 150a-150c, respectively. The file systems 150a and 150b are accessible by virtualization infrastructure 120. In one embodiment, access to file systems 150a and 150b is subject to authentication that such access is permitted. In one embodiment, virtual machines 130a and 130b include agents 140a and 140b, respectively, that are configured to communicate with virtualization infrastructure 120. Agents 140a and 140b are operable to carry out commands from virtualization infrastructure 120. An example agent is implemented using VMware Tools.

EXAMPLE SYSTEMS FOR VIEWING A SNAPSHOT OF A VIRTUAL MACHINE

Embodiments described herein provide for viewing a snapshot of a virtual machine during operation of the virtual machine. In one embodiment, during operation of a virtual machine in a first console, at least one snapshot of the virtual machine is presented for selection. Responsive to a selection of the snapshot, a second virtual machine of the selected snapshot is deployed in a second console, wherein the second virtual machine is deployed without closing the virtual machine in the first console or losing the current state of the virtual machine. It should be appreciated that the term "console" as used herein refers to a mechanism or configuration by which an entity, such as a user, can interact with a virtual machine. In one embodiment, a console could be a collection of windows presented in a windowing system a host computer system, such as that provided by VMware's Unity Mode.

Figure 2:
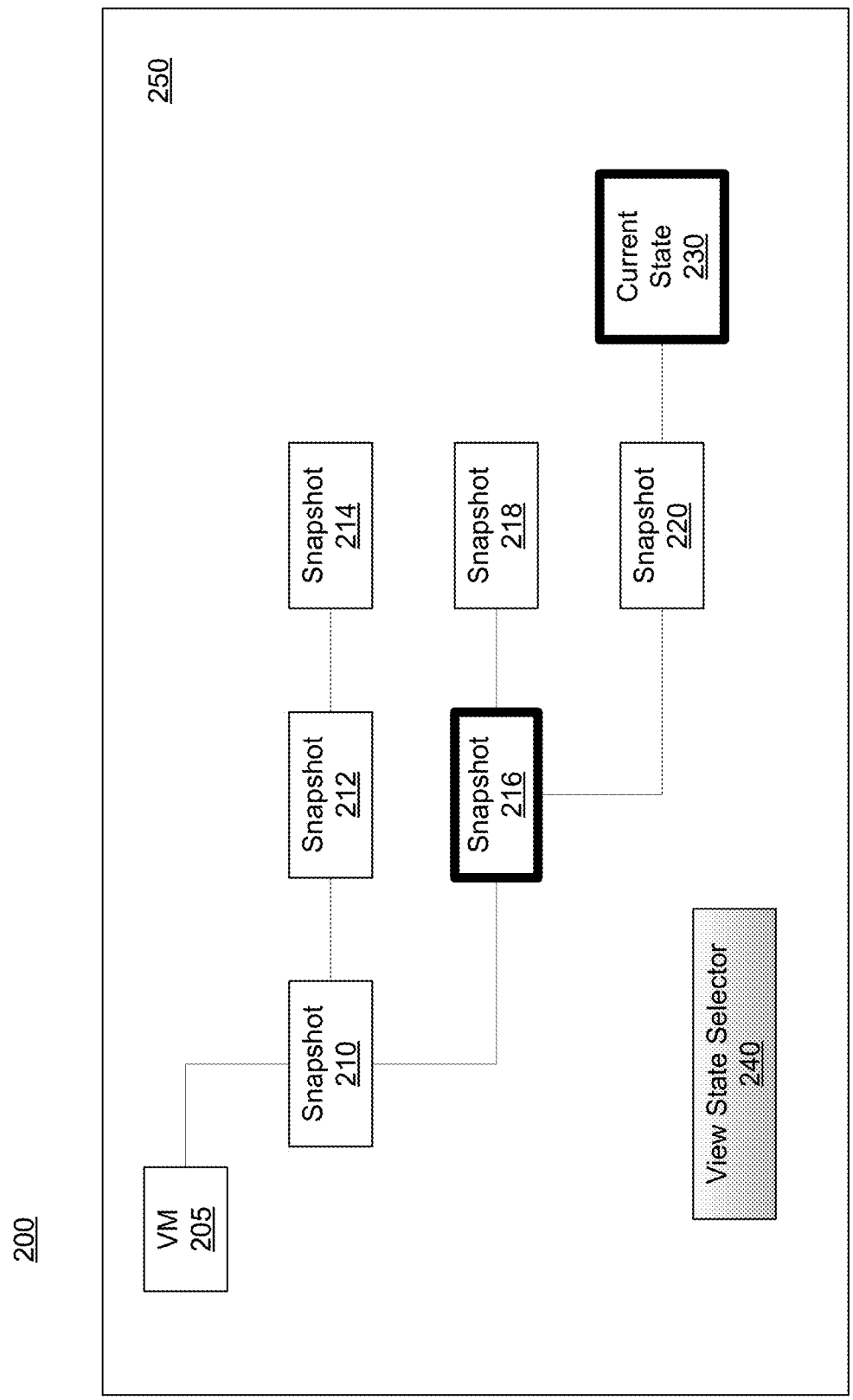
FIG. 2 is an example screen shot of a snapshot viewer, in accordance with embodiments.

FIG. 2 is an example screen shot 200 of a snapshot viewer 250, in accordance with embodiments. Snapshot viewer 250 includes a hierarchy of snapshots for virtual machine 205. In one embodiment, snapshot viewer 250 is included within a snapshot manager. A snapshot manager is a tool for managing snapshots of a virtual machine, supporting navigation of the snapshots and enabling functions such as snapshot creation, deletion, and restoration.

As shown, the snapshot hierarchy for virtual machine 205 is a tree with two branches. In various embodiments, the relationship between snapshots is a parent-child relationship. For example, snapshot 210 is a parent of snapshot 212 and snapshot 214 is a child of snapshot 212. Snapshot 210 is also the parent of snapshot 216, where snapshot 216 is the parent of snapshot 218 and snapshot 220. The current machine state of virtual machine 205 is shown at current state 230. It should be appreciated that the snapshot hierarchy of FIG. 2 is an example, and that snapshot viewer 200 may include any number of snapshots for a virtual machine. In one embodiment, snapshot viewer 250 also enables the creation of a snapshot of current state 230.

As shown in FIG. 2, snapshot viewer 250 also includes view state selector 240. View state selector 240 is a graphical user interface button that allows for the selection of a previous state of virtual machine 205, represented by a snapshot, to be shown. In one embodiment, as shown in FIG. 2, current state 230 and snapshot 216 are selected, as indicated by the thick borders. For example, a user interacting with a mouse or other user input device, such as a touchscreen, would select states for viewing, then interact with view state selector 240 to view the selected states. It should be appreciated that, in one embodiment, current state 230 is automatically selected as being an operating state of virtual machine 205.

In another embodiment, each snapshot has an associated view state selector, allowing for individual selection of each state. It should be appreciated that the many different graphical user interface tools may be used to allow for the selection of a snapshot for viewing, and that the described embodiments are examples. Moreover, it should be appreciated that multiple snapshots may be selected for concurrent viewing.

In one embodiment, snapshot viewer 250 is accessed during operation of the current state of virtual machine 205. For example, snapshot viewer 250 might be accessed from a menu of virtual machine 205. In another example, snapshot viewer 250 is accessed at a virtualization manager of the virtualization infrastructure.

Responsive to the selection of a state for viewing in snapshot viewer 250 by a selection of at least one snapshot and an interaction with view state selector 240, the selected state, e.g., snapshot 216, is deployed concurrent to the operation of current state 230 of the virtual machine. In one embodiment, a second virtual machine is deployed in a second console using the selected snapshot, during the operation of the current state of virtual machine 205 in a first console. In one embodiment, the second virtual machine is a clone of virtual machine 205. In another embodiment, the second virtual machine is a linked clone of virtual machine 205.

It should be appreciated that more than one snapshot may be selected for viewing in snapshot viewer 250. Each selected snapshot is deployed as a new virtual machine in a new console. The new virtual machines are deployed concurrent to the operation of the current state of the virtual machine in a first console.

Figure 3:
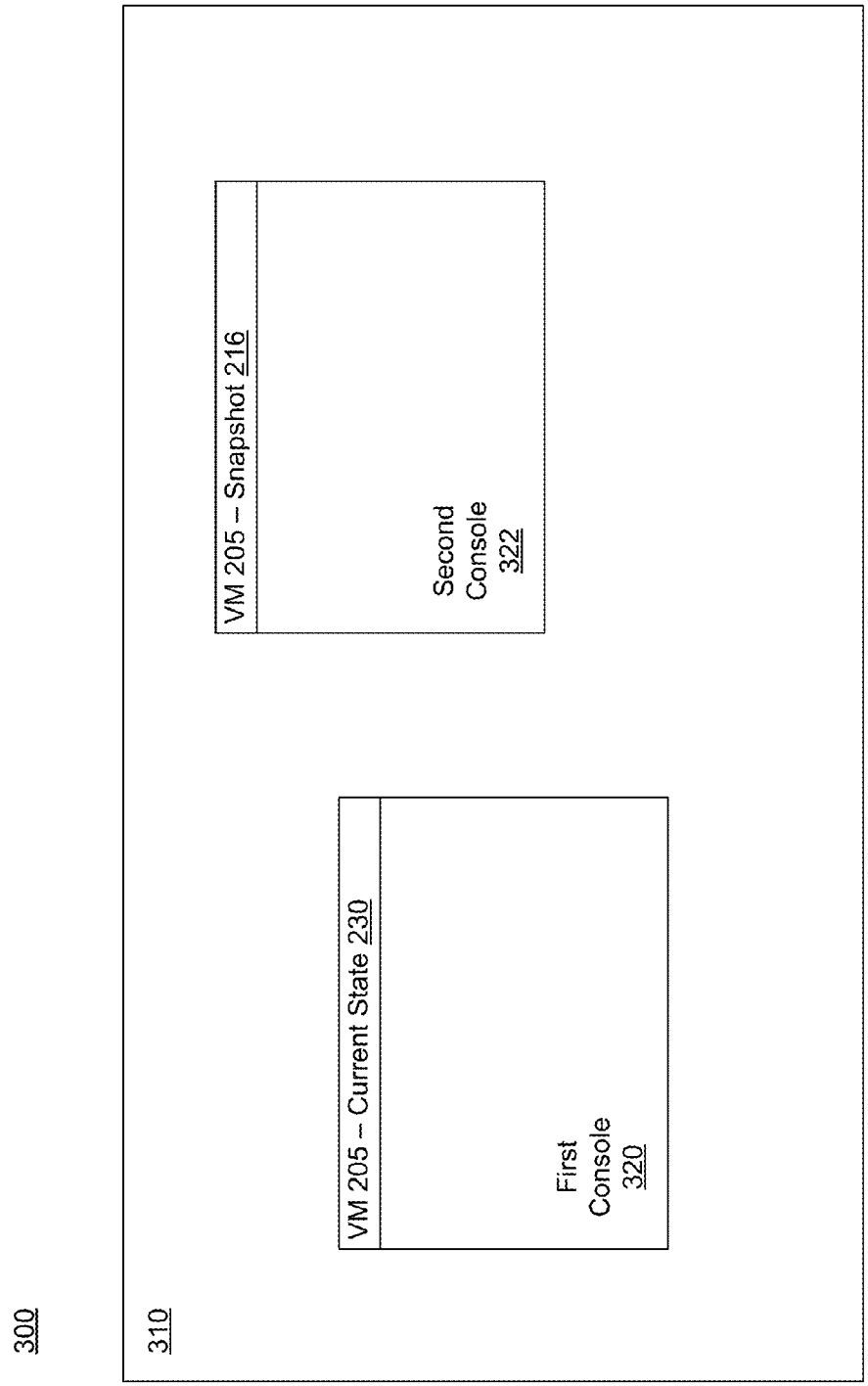
FIG. 3 is an example screen shot of two consoles showing different states of a virtual machine, in accordance with embodiments.

FIG. 3 is an example screen shot 300 of a virtual machine viewer 310 including two consoles showing different states of a virtual machine, in accordance with embodiments. As shown in FIG. 3, the current state of virtual machine 205 is executed in first console 320 and the previous state of virtual machine 205 associated with snapshot 216, is executed in second console 322. Accordingly, two different states of virtual machine 205 can be viewed at the same time, allowing for comparisons between the two states. Moreover, the previous state of virtual machine 205 may be viewed in second console 322 without having to close the current state of virtual machine 205 in first console 320.

EXAMPLE SYSTEMS FOR COMPARING STATES OF A VIRTUAL MACHINE

Embodiments described herein provide for comparing states of a virtual machine. In one embodiment, a plurality of selectable states including a current state of a virtual machine and at least one snapshot of the virtual machine are presented for selection. Responsive to a selection of at least two states of the plurality of selectable states, a comparison tool is presented for comparing information between the at least two states of the virtual machine.

Figure 4:
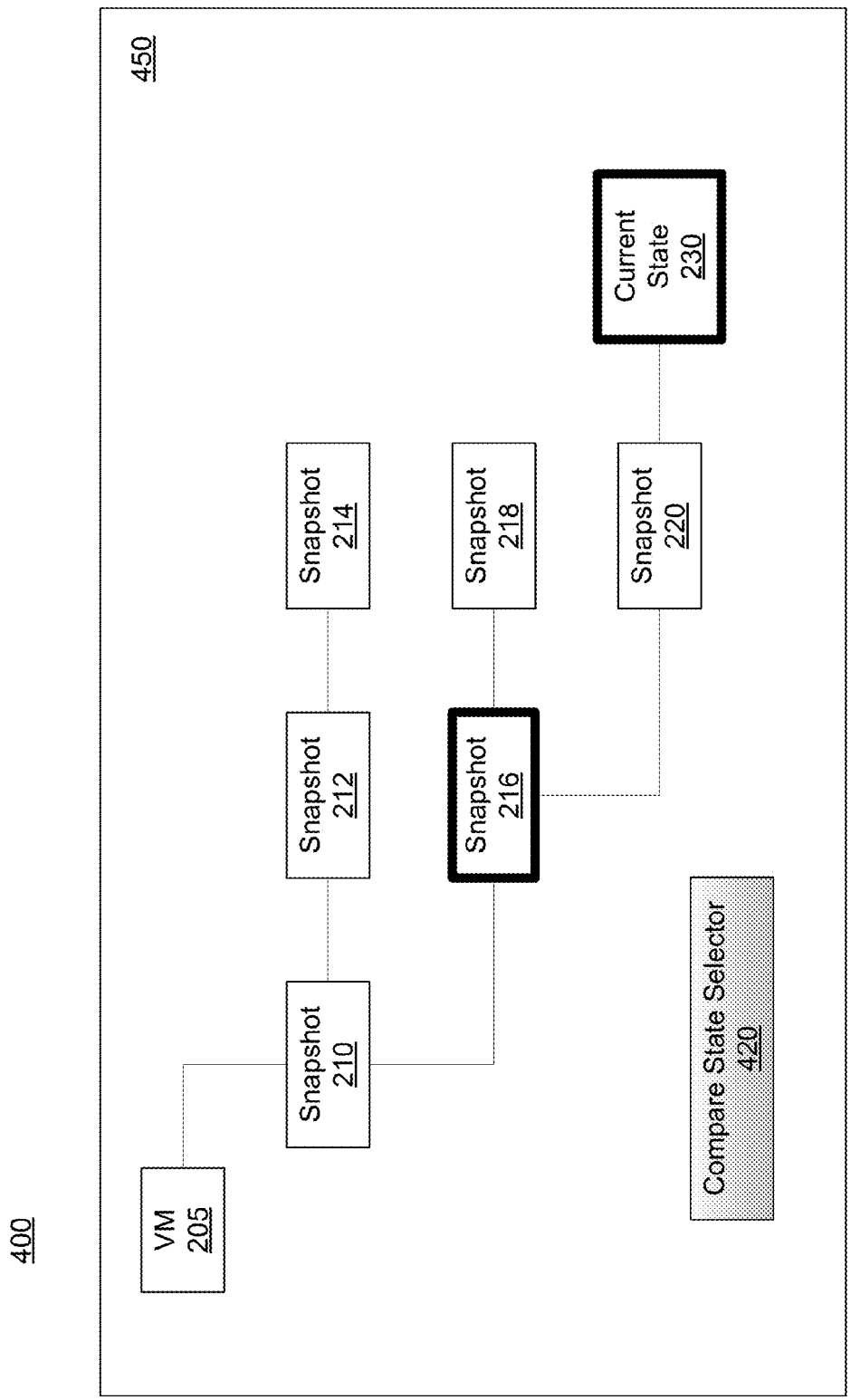
FIG. 4 is an example screen shot of a snapshot viewer for comparing different states of a virtual machine, in accordance with embodiments.

FIG. 4 is an example screen shot 400 of a snapshot viewer 450 for comparing different states of a virtual machine 205, in accordance with embodiments. Snapshot viewer 450, similar to snapshot viewer 250 of FIG. 2 includes a hierarchy of snapshots for virtual machine 205. In one embodiment, snapshot viewer 450 is included within a snapshot manager. As shown, the snapshot hierarchy for virtual machine 205 is a tree with two branches. In various embodiments, the relationship between snapshots is a parent-child relationship. For example, snapshot 210 is a parent of snapshot 212 and snapshot 214 is a child of snapshot 212. Snapshot 210 is also the parent of snapshot 216, where snapshot 216 is the parent of snapshot 218 and snapshot 220. The current machine state of virtual machine 205 is shown at current state 230. It should be appreciated that the snapshot hierarchy of FIG. 4 is an example, and that snapshot viewer 200 may include any number of snapshots for a virtual machine. Moreover, it should be appreciated that snapshot viewer 450 can be snapshot viewer 250 of FIG. 2.

As shown in FIG. 4, snapshot viewer 450 also includes compare state selector 420. Compare state selector 420 is a graphical user interface button that allows comparison of states of virtual machine 205, represented by snapshots, to be shown. In one embodiment, as shown in FIG. 4, current state 230 and snapshot 216 are selected, as indicated by the thick borders. For example, a user interacting with a mouse or other user input device, such as a touchscreen, would select states for viewing, then interact with compare state selector 420 to view the selected states. It should be appreciated that, in one embodiment, current state 230 is automatically selected as being an operational state of virtual machine 205. Also, it should be appreciated that any snapshots can be selected for comparison, and need not include current state 230.

In another embodiment, each snapshot has an associated compare state selector, allowing for individual selection of each state for comparison to another state. In another embodiment, each snapshot has a menu allowing for a selection to be compared to another snapshot of the snapshot hierarchy. It should be appreciated that the many different graphical user interface tools may be used to allow for the selection of a snapshot for comparing, and that the described embodiments are examples. Moreover, it should be appreciated that multiple snapshots may be selected for comparison.

In one embodiment, snapshot viewer 450 is accessed during operation of the current state of virtual machine 205. For example, snapshot viewer 450 might be accessed from a menu of virtual machine 205. In another example, snapshot viewer 450 is accessed at a virtualization manager of the virtualization infrastructure.

Responsive to the selection of snapshots for comparison in snapshot viewer 450, by a selection of at least two states and an interaction with compare state selector 420, the selected states, e.g., snapshot 216 and current state 230, are deployed. In one embodiment, it is first determined if the selected states are operational. If all selected states are already operational, a comparison tool of the selected states may be presented. If one or more of the selected states are not operational, the snapshots are each deployed as virtual machines in new consoles. In one embodiment, the deployment of a virtual machine is executed as described above in accordance with FIGS. 2 and 3. For example, where snapshot 216 and current state 230 are selected, snapshot 216 is deployed concurrent to the operation of current state 230 of the virtual machine. In one embodiment, a second virtual machine is deployed in a second console using the selected snapshot during the operation of the current state of virtual machine 205 in a first console. In one embodiment, the second virtual machine is a clone of virtual machine 205. In another embodiment, the second virtual machine is a linked clone of virtual machine 205.

Embodiments described herein provide for the comparison between two states of a virtual machine. For example, the information that can be compared includes, without limitation: running processes, installed applications, file systems, registry entries, environment variables, user management, open network ports, and virtual machine properties. In one embodiment, the comparison tool allows for selection of which information to compare, so that a user can tailor the comparison to focused areas. For example, the comparison tool may present a selection screen for selecting which information to present in the comparison tool. In one embodiment, the comparison tool is presented in a new window. In one embodiment, the comparison tool is presented in a snapshot manager.

In one embodiment, the comparison tool includes a dialog box where information being compared is displayed. In one embodiment, different information being compared is color coded to provide additional contextualization. For example, consistent information is highlighted in green, different information is highlighted in red, and modified information is highlighted in yellow. The information that can be compared includes, without limitation:

1. Running processes, including process name, central processing unit (CPU) usage, and memory usage. For example, new processes created between states are highlighted in green, existing processes whose statistics are inconsistent are highlighted in yellow, and old processes that died between states are highlighted in red;
2. Installed applications including name, version, and install date. For example, new applications are highlighted in green, deleted applications are highlighted in red, and existing applications (same name) with different values are highlighted in yellow;
3. Registry entries for applicable operating systems (e.g., Microsoft Windows) including registry key and values. For example, new registry keys are highlighted in green, deleted registry keys are highlighted in red, and existing registry keys (same name) with different values are highlighted in yellow;
4. Environmental variables including environmental variable key and value. For example, new environmental variable keys are highlighted in green, deleted environmental variable keys are highlighted in red, and existing environmental variable keys (same name) with different values are highlighted in yellow;
5. File system including file name, file size, file directory, file creation time, and file modified date. For example, new files are highlighted in green, deleted files are highlighted in red, and existing files (same name) with different values are highlighted in yellow;
6. User management including user name, user group, and user permissions. For example, new users are highlighted in green, deleted users are highlighted in red, and existing users (same name) with different values are highlighted in yellow;
7. Open network ports including protocol, state, local address, foreign address, send queue, and receive queue. For example, new ports are highlighted in green, ports are highlighted in red, and existing ports (same name) with different values are highlighted in yellow; and 8. Virtual machine properties including virtual machine name, computer name, operating system family, operating system, virtual hardware version, CPU allocation, memory allocation, and synchronization time. For example, consistent information is highlighted in green, different information is highlighted in red, and modified information is highlighted in yellow.

Figure 5:
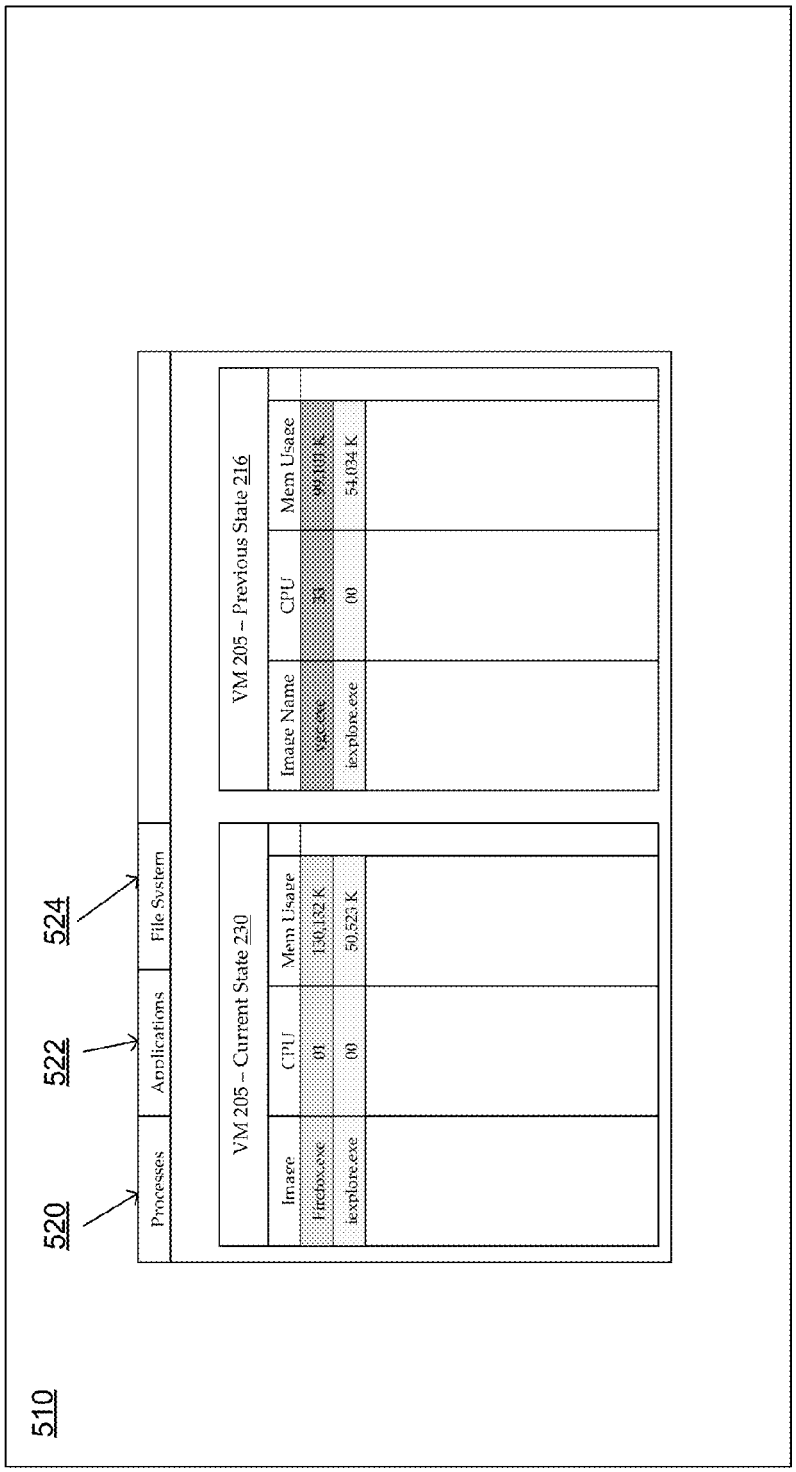
FIG. 5 is an example screen shot of a comparison tool for comparing different states of a virtual machine, in accordance with embodiments.

FIG. 5 is an example screen shot 500 of a comparison tool 510 for comparing different states of a virtual machine, in accordance with embodiments. As shown in FIG. 5, the comparison tool 510 presents information for both the current state of virtual machine 205 and the previous state of snapshot 216 for virtual machine 205. Comparison tool 510 includes selectable tabs 520, 522 and 524 for toggling between information of the different states of virtual machine 205.

As shown in FIG. 5, selectable tab 520 is selected for presenting information related to the running processes of the selected states. The process Firefox.exe is highlighted in a first color (e.g., green) as it is a new process, the process vgc.exe is highlighted in a second color (e.g., red) as it is a closed process, and process iexplore.exe is highlighted in a third color (e.g., yellow) as it is a process running in both states of virtual machine 205 and has different memory usage values.

In various embodiments, agents (e.g., agents 140a and 140b of FIG. 1) are installed in the virtual machines for gathering information required for comparing two states of the virtual machine. When the compare command is executed, a clone of the virtual machine is created for the selected snapshot and the agent is triggered to collect the information of the virtual machines. In various embodiments, existing command line utilities related to particular operating systems are used. For example, command line utilities used to obtain the machine info are:
1. Running processes
   a. In Windows—Wmic, psinfo and tasklist
   b. In Linux—ps
2. Installed applications
   a. In Windows—wmic, reg.exe
   b. In Linux—rpm, dpkg
3. Registry entries (windows)
   a. Windows—Regedit, reg.exe
4. Environment variables
   a. In Windows—Set
   b. In Linux—env
5. File system
   a. In windows—dir
   b. In Linux—find
6. User management
   a. In Window—Net User
   b. In Linux—User Manager
7. Open network ports
   a. Netstat (windows and linux)

EXAMPLE SYSTEMS FOR MODIFYING A STATE OF A VIRTUAL MACHINE

Embodiments described herein provide for modifying a state of a virtual machine. Information between two states of a virtual machine is compared, wherein the two states include a current state of the virtual machine and previous state of the virtual machine. Information that is different between the two states is identified. The information that is different between the two states is presented, wherein the information that is different is selectable for copying between the two states.

Figure 6:
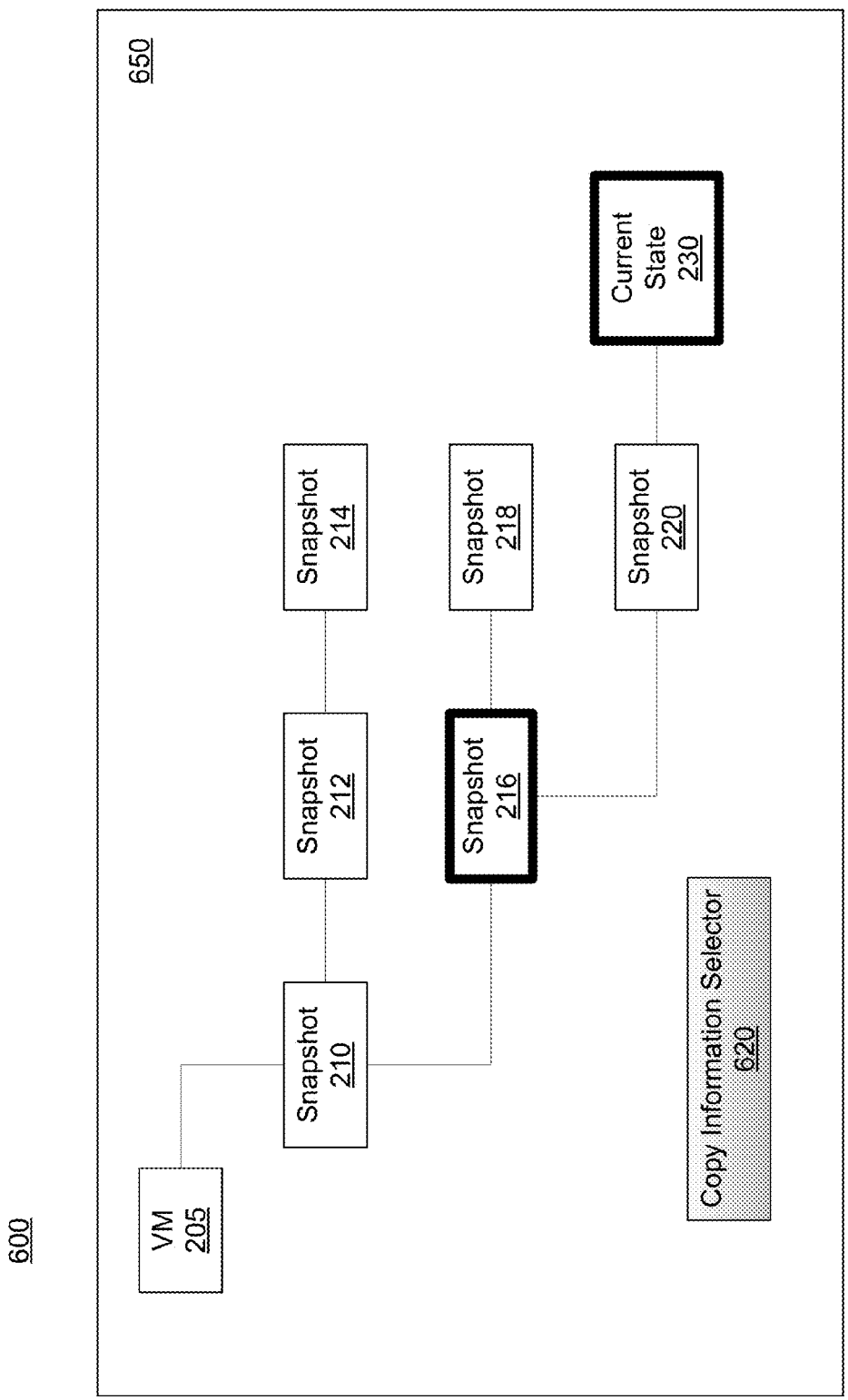
FIG. 6 is an example screen shot of a snapshot viewer for copying information between states of a virtual machine, in accordance with embodiments.

FIG. 6 is an example screen shot 600 of a snapshot viewer 650 for copying information between states of a virtual machine 205, in accordance with embodiments. Snapshot viewer 650, similar to snapshot viewer 250 of FIG. 2 and snapshot viewer 450 of FIG. 4, includes a hierarchy of snapshots for virtual machine 205. In one embodiment, snapshot viewer 650 is included within a snapshot manager. As shown, the snapshot hierarchy for virtual machine 205 is a tree with two branches.

As shown in FIG. 6, snapshot viewer 650 also includes copy information selector 620. Copy information selector 620 is a graphical user interface button that allows for the compared of states of virtual machine 205, represented by a snapshots, to be shown. In one embodiment, as shown in FIG. 6, current state 230 and snapshot 216 are selected, as indicated by the thick borders. For example, a user interacting with a mouse or other user input device, such as a touchscreen, would select states for viewing, then interact with copy information selector 620 to view information available for copying between the selected states. It should be appreciated that, in one embodiment, current state 230 is automatically selected as being an operational state of virtual machine 205.

In another embodiment, each snapshot has an associated copy information selector, allowing for individual selection of each state. In another embodiment, each snapshot has a menu allowing for a selection for copying files to another snapshot of the snapshot hierarchy. It should be appreciated that the many different graphical user interface tools may be used to allow for the selection of a snapshot for copying information to another snapshot, and that the described embodiments are examples. Moreover, it should be appreciated that multiple snapshots may be selected for concurrent viewing.

It should be appreciated that a single snapshot viewer can include the functions of snapshot viewers 250, 450 and 650. For instance, while snapshot viewers 250, 450 and 650, are described separately herein, a single snapshot viewer that presents a snapshot hierarchy for a virtual machine can include a view state collector, a compare state selector, and a copy information selector.

In one embodiment, snapshot viewer 650 is accessed during operation of the current state of virtual machine 205. For example, snapshot viewer 650 might be accessed from a menu of virtual machine 205. In another example, snapshot viewer 650 is accessed at a virtualization manager of the virtualization infrastructure.

Embodiments provide a user with an option to copy files from a previous snapshot to the current state, thereby allowing for the creation of a hybrid state from multiple snapshots. In response to selecting a snapshot to copy files from, a copy tool is opened, allowing the user to browse through files of the virtual machines corresponding to the selected snapshot and the current state. In one embodiment, information that is different between the two states (e.g., information identified in the comparison described above in accordance with FIGS. 2 and 3) is presented.

In one embodiment, information is different where there is information that is present in both states, but the properties of the information are different. For example, information in the previous state may have associated information in the current state, where the information exists in both states but has different properties. A specific example of different associated information is where a file exists in both states, but properties of the file are different, such as different file size or creation time.

In one embodiment, information is different where the contents of the information are different across both states. For example, a media file may be present in both states, but includes different contents, or may have become corrupted. In one embodiment, a checksum operation is performed in the media file in both states. If the checksum operation results are different, the media files are identified as different.

In one embodiment, information is different where information is present in one state but missing in the other state. For example, information in the previous states may be missing in the current state, e.g., a file is missing from the current state. A specific example of a missing file is a dynamic-linked library (DLL) file that is present in the previous state but is missing in the current state.

For example, a corresponding parent folder and drive is highlighted in a first color, e.g., gray, indicating that one or more of the files or folders in the parent folder have been changed, and files that are different between the two states, e.g., different file size, modified time, or creation time) are highlighted in a particular color, e.g., red.

With reference to FIG. 1, in various embodiments, agents (e.g., agents 140a and 140b of FIG. 1) are installed in the virtual machines for executing the copy operation between two states of the virtual machine. In response to a file being selected for copying from a previous state to a current state, a clone of the virtual machine is deployed for the selected snapshot. In one embodiment, the file systems of the selected states are compared. A command to gather file system information (e.g., from file system 150a) is triggered at virtualization infrastructure 120 and issued to agent 140a for gathering information from file system 150a.

Figure 7:
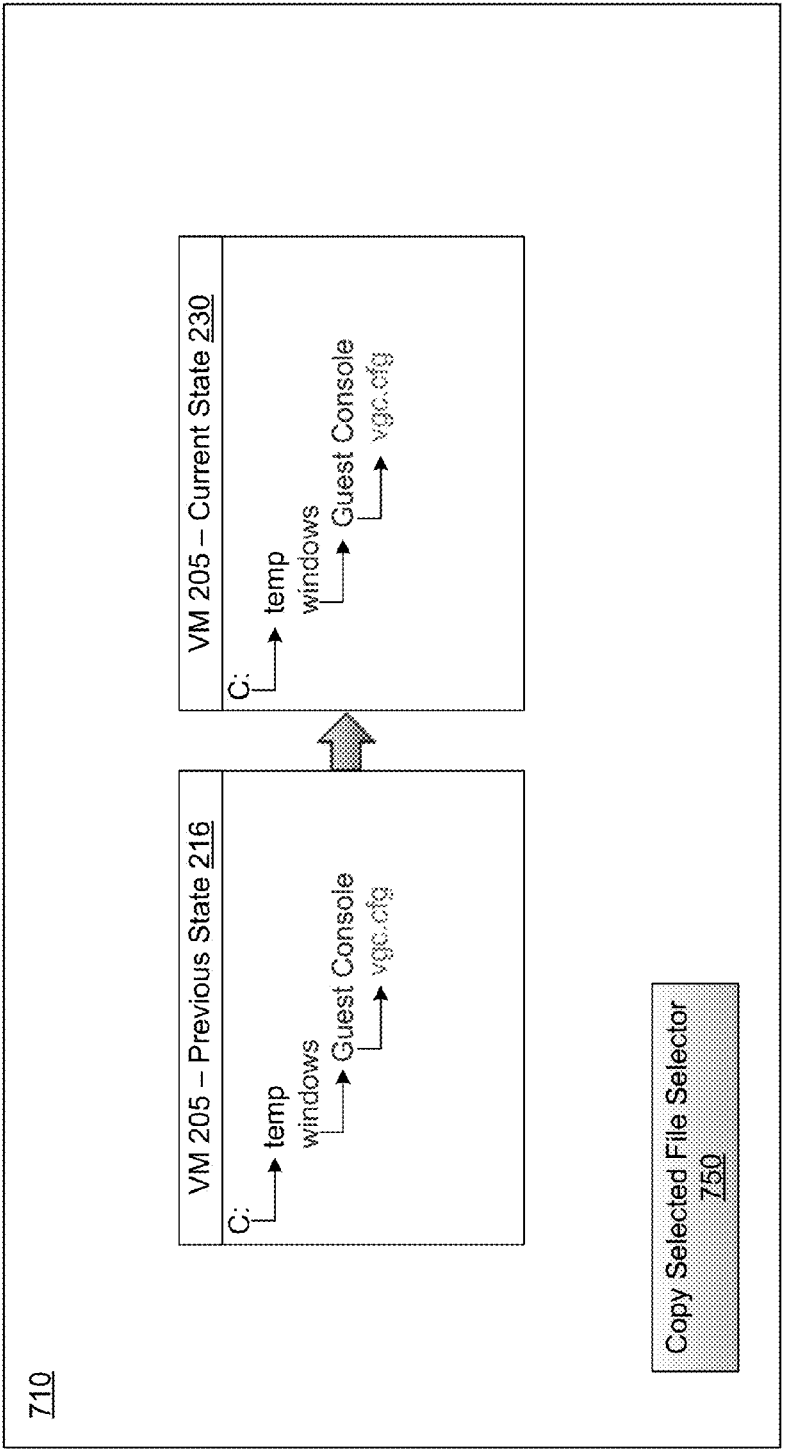
FIG. 7 is an example screen shot of a copy tool for copying information between states of a virtual machine, in accordance with embodiments.

FIG. 7 is an example screen shot 700 of a copy tool 710 for copying information between states of a virtual machine, in accordance with embodiments. As shown in FIG. 7, an example file system directory for the current state of virtual machine 205 and the previous state of virtual machine 205 associated with snapshot 216. A user may browse the file system directories to determine which files to copy from the previous state to the current state. For example, the folder "Guest Console" is highlighted in a first color, e.g., gray, to indicate that it includes at least one file or folder that is different between the two file systems, and the file "vgc.cfg" is highlighted in a second color, e.g., red, to indicate that it is different between the two file systems.

As shown in FIG. 7, the file from the previous state is selected by a user and copied to the current state by interacting with copy selected file selector 750. It should be appreciated that files can be copied between states using other commands, e.g., right clicking on the file and selecting that the file be copied to current state, and that the illustrated embodiment is an example. In one embodiment, a snapshot of the current state is captured prior to copying information into the current state.

Files and/or directories may be copied from a previous state to a current state. It should be appreciated that the copy operation may be an overwrite copy, a recursive copy, or any other type of copy. In one embodiment, once the copy operation is completed, e.g., the copy tool is closed, the clone of the virtual machine associated with the previous state is discarded. In other words, the copy operation is a read-only operation with respect to the previous state.

EXAMPLE METHODS OF OPERATION

The following discussion sets forth in detail the operation of some example methods of operation of embodiments.

With reference to FIGS. 8 through 11, flow diagrams 800, 900, 1000 and 1020 illustrate example procedures used by various embodiments. Flow diagrams 800, 900, 1000 and 1020 include some procedures that, in various embodiments, are carried out by a processor under the control of computer-readable and computer-executable instructions. In this fashion, procedures described herein and in conjunction with flow diagrams 800, 900, 1000 and/or 1020 are, or may be, implemented using a computer, in various embodiments. The computer-readable and computer-executable instructions, e.g., computer readable program code, can reside in any tangible computer readable storage media. Some non-limiting examples of tangible computer readable storage media include random access memory, read only memory, magnetic disks, solid state drives/"disks," and optical disks, any or all of which may be employed. The computer-readable and computer-executable instructions, which reside on tangible computer readable storage media, are used to control or operate in conjunction with, for example, one or some combination of processors of a computing system. It is appreciated that the processor(s) may be physical or virtual or some combination (it should also be appreciated that a virtual processor is implemented on physical hardware).

Although specific procedures are disclosed in flow diagrams 800, 900, 1000 and 1020, such procedures are examples. That is, embodiments are well suited to performing various other procedures or variations of the procedures recited in flow diagram 800, 900, 1000 and/or 1020. Likewise, in some embodiments, the procedures in flow diagrams 800, 900, 1000 and/or 1020 may be performed in an order different than presented and/or not all of the procedures described in one or more of these flow diagrams may be performed. It is further appreciated that procedures described in flow diagram 800, 900, 1000 and/or 1020 may be implemented in hardware, or a combination of hardware with firmware and/or software.

Figure 8:
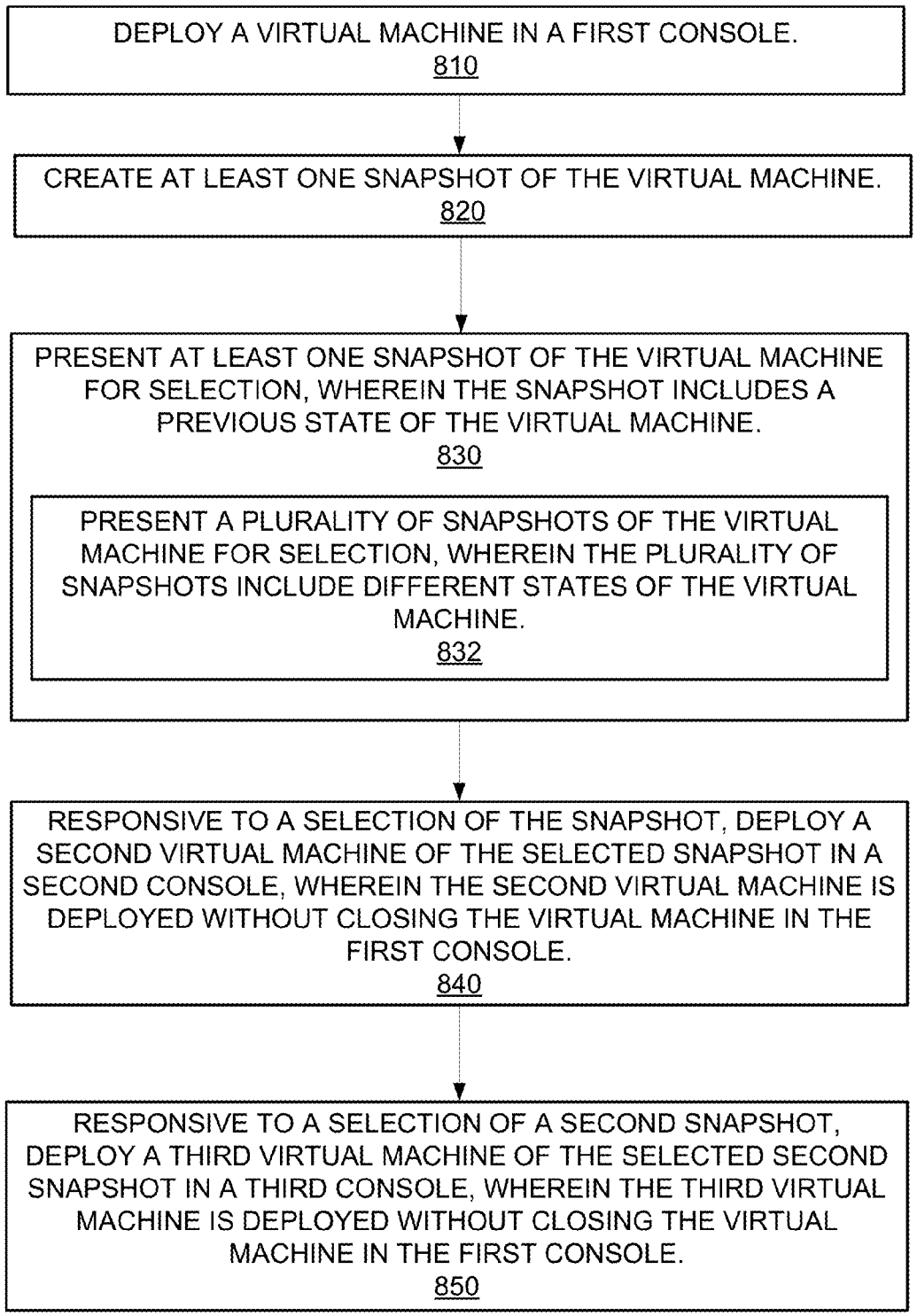
FIG. 8 is flow diagram of a method for viewing a snapshot of a virtual machine, in accordance with various embodiments.

FIG. 8 is flow diagram 800 of a method for viewing a snapshot of a virtual machine, in accordance with various embodiments. In one embodiment, as shown at procedure 810 of flow diagram 800, a virtual machine is deployed in first console. In one embodiment, as shown at procedure 820, at least one snapshot of the virtual machine is created.

At procedure 830, at least one snapshot of the virtual machine is presented for selection, wherein the snapshot includes a previous state of the virtual machine. In one embodiment, the at least one snapshot is presented during operation of a virtual machine in the first console. In one embodiment, a plurality of snapshots of the virtual machine is presented for selection, wherein the plurality of snapshots includes different states of the virtual machine. In one embodiment, the snapshot includes a power state of the virtual machine. In one embodiment, the snapshot includes data and a memory state of an operating system of the virtual machine. In one embodiment, the snapshot includes settings and configuration data of the virtual machine. In one embodiment, the at least one snapshot of the virtual machine for selection is presented at a menu of the virtual machine. In one embodiment, the at least one snapshot of the virtual machine for selection is presented at a virtualization manager.

At procedure 840, responsive to a selection of the snapshot, a second virtual machine of the selected snapshot is deployed in a second console, wherein the second virtual machine is deployed without closing the virtual machine in the first console. In one embodiment, the second virtual machine is a clone of the virtual machine. In one embodiment, the second virtual machine is a linked clone of the virtual machine.

In one embodiment, as shown at procedure 850, responsive to a selection of a second snapshot, a third virtual machine of the selected second snapshot is deployed in a third console, wherein the third virtual machine is deployed without closing the virtual machine in the first console.

Figure 9:
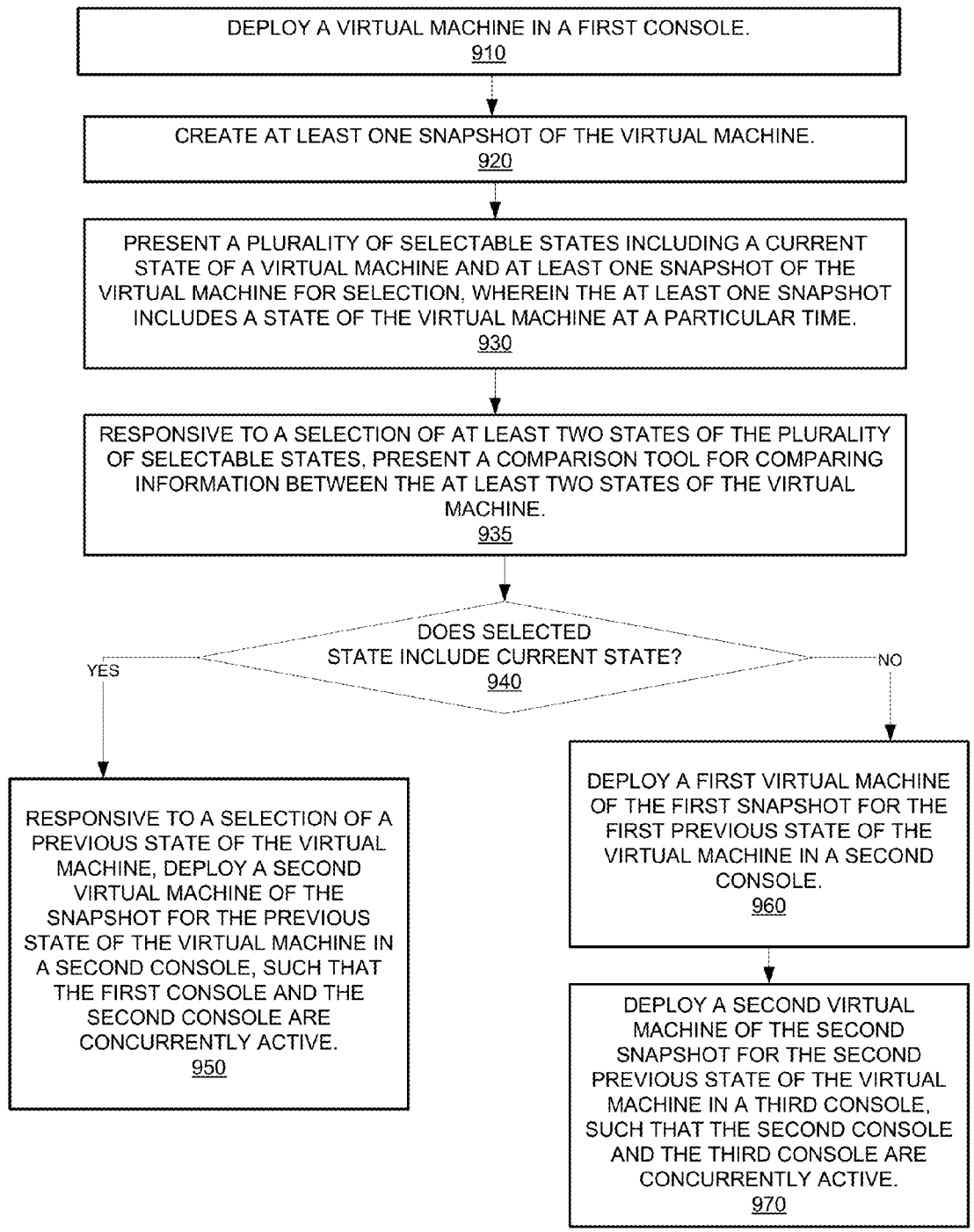
FIG. 9 is a flow diagram of a method for comparing states of a virtual machine, in accordance with various embodiments.

FIG. 9 is a flow diagram 900 of a method for comparing states of a virtual machine, in accordance with various embodiments. In one embodiment, as shown at procedure 910 of flow diagram 900, a virtual machine is deployed in first console. In one embodiment, as shown at procedure 920, at least one snapshot of the virtual machine is created.

At procedure 930, a plurality of selectable states including a current state of a virtual machine and at least one snapshot of the virtual machine are presented for selection, wherein the at least one snapshot includes a state of the virtual machine at a previous state. In one embodiment, the plurality of selectable states is presented during operation of the virtual machine in a first console. In one embodiment, the comparison tool is presented in a new window. In one embodiment, the plurality of selectable states and the comparison tool are presented in a snapshot manager.

At procedure 935, responsive to a selection of at least two states of the plurality of selectable states, a comparison tool for comparing information between the at least two states of the virtual machine is presented. In one embodiment, the information includes performance analytics of the at least two states of the virtual machine. In one embodiment, the information includes running processes, installed applications, and file systems of the at least two states of the virtual machine. In one embodiment, the information includes at least one of: running processes, installed applications, file systems, registry entries, environment variables, user management, open network ports, and virtual machine properties. In one embodiment, wherein information that is different between the at least two states of the virtual machine is color coded.

At procedure 940, it is determined whether the selected state includes the current state. Where the selection of at least two states includes the current state of the virtual machine and a snapshot of a previous state of the virtual machine, flow diagram 900 proceeds to procedure 950. Where the selection of at least two states does not include the current state of the virtual machine, flow diagram 900 proceeds to procedure 960.

In one embodiment, as shown at procedure 950, responsive to a selection of the snapshot of a previous state of the virtual machine, deploying a second virtual machine of the snapshot for the previous state of the virtual machine in a second console, such that the first console and the second console are concurrently active.

In another embodiment, as shown at procedure 960, where the selection of at least two states includes a first snapshot of a state of the virtual machine at a first previous state and a second snapshot of a state of the virtual machine at a second previous state, a first virtual machine of the first snapshot for the first previous state of the virtual machine is deployed in a second console. At procedure 970, a second virtual machine of the second snapshot for the second previous state of the virtual machine is deployed in a third console, such that the second console and the third console are concurrently active.

FIG. 10 is a flow diagram 1000 of a method for modifying a state of a virtual machine, in accordance with various embodiments.

At procedure 1010 of flow diagram 1000, information between two states of a virtual machine is compared, wherein the two states include a current state of the virtual machine and previous state of the virtual machine. The previous state of the virtual machine is included within a snapshot of the virtual machine at the previous state. In one embodiment, the information includes files of the two states.

Figure 11:
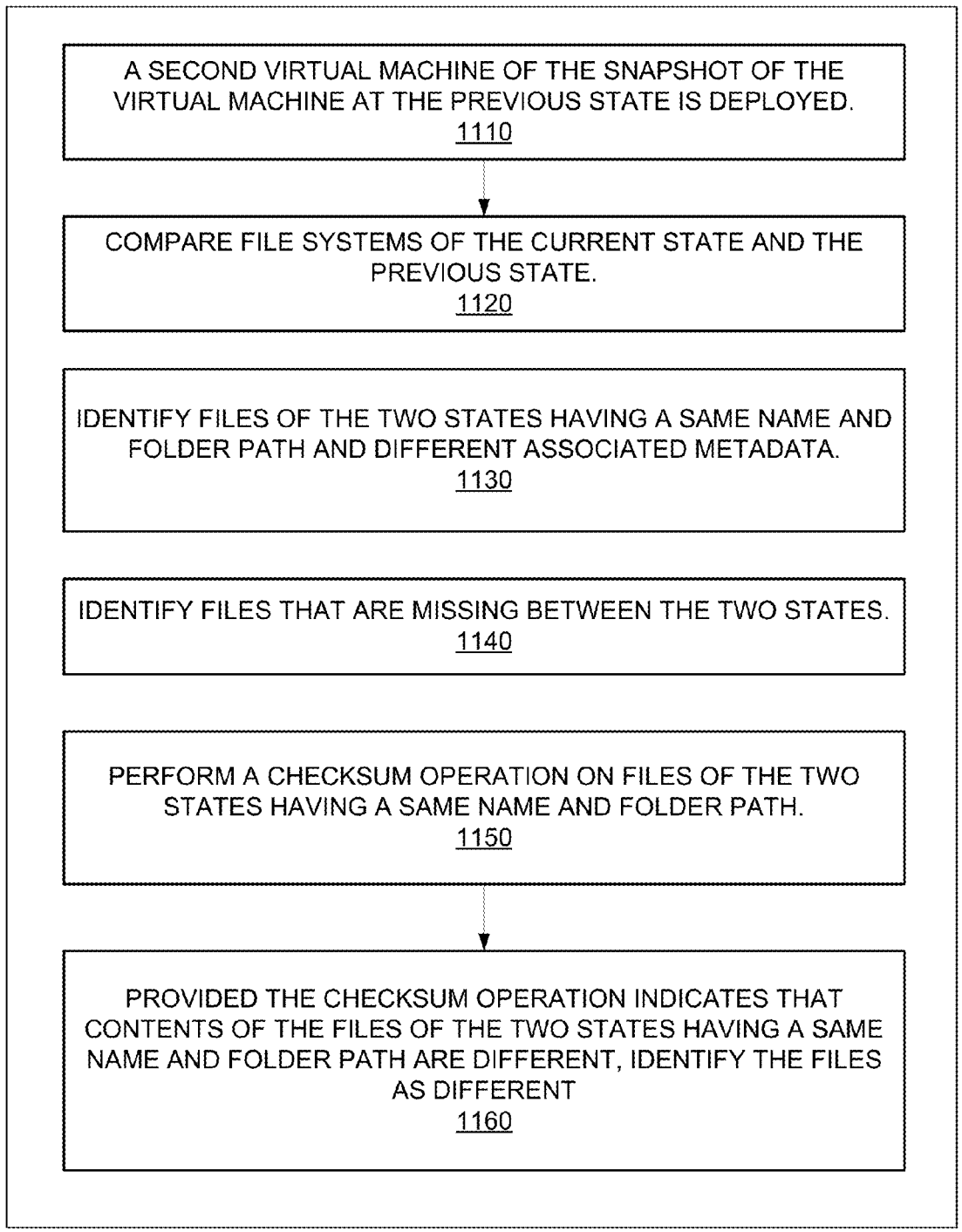
FIG. 11 is flow diagram of a method for identifying which information is different between the two states of a virtual machine, in accordance with various embodiments.

At procedure 1020, information that is different between the two states is identified. It should be appreciated that procedure 1020 includes many possible procedures for identifying information that is different between the two states. Various embodiments of procedure 1020 are illustrated in flow diagram 1020 of FIG. 11. FIG. 11 is flow diagram 1020 of a method for identifying which information is different between the two states of a virtual machine, in accordance with various embodiments.

In one embodiment, as shown at procedure 1110 of flow diagram 1020, a second virtual machine of the snapshot of the virtual machine at the previous state is deployed. At procedure 1120, file systems of the current state and the previous state are compared.

In one embodiment, as shown at procedure 1130, files of the two states having a same name and folder path and different properties are identified. In one embodiment, the properties include at least on of file size, modification time, and creation time. In one embodiment, as shown at procedure 1140, files that are missing between the two states are identified.

In one embodiment, as shown at procedure 1150, a checksum operation is performed on files of the two states having a same name and folder path. At procedure 1160, provided the checksum operation indicates that contents of the files of the two states having a same name and folder path are different, the files are identified as different.

Returning to flow diagram 1000 of FIG. 10, at procedure 1030, the information that is different between the two states is presented, wherein the information that is different is selectable for copying between the two states. In one embodiment, the information that is different is color coded.

In one embodiment, as shown at procedure 1040, prior to modifying the current state to include the selected information, a snapshot of the current state is captured.

In one embodiment, as shown at procedure 1050, the current state of the virtual machine is modified to include the selected information. In one embodiment, as shown at procedure 1060, provided the selected information has associated information in the current state, the associated information in the current state is replaced with the selected information. In one embodiment, as shown at procedure 1070, provided the selected information does not have associated information in the current state, the selected information is added to the current state. In one embodiment, the previous state of the virtual machine is not modifiable. In one embodiment, the current state is modified using an agent on the virtual machine.

Example embodiments of the subject matter are thus described. Although various embodiments have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method for comparing states of a virtual machine, the method comprising:

presenting a plurality of selectable states of a virtual machine within a snapshot viewer, the plurality of selectable states comprising a current state of a virtual machine, a first snapshot of a first previous state of the virtual machine and a second snapshot of a second previous state of the virtual machine;
responsive to the selection of the first snapshot and the second snapshot:
    deploying a first virtual machine of the first snapshot for a first previous state of the virtual machine in a first console of a host computer system; and
    deploying a second virtual machine of the second snapshot for a second previous state of the virtual machine in a second console of the host computer system, such that the first console and the second console are concurrently active within the host computer system;
responsive to deploying the first virtual machine and the second virtual machine, collecting information for use from the first virtual machine in the first console and the second virtual machine in the second console for use in comparing the first previous state to the second previous state, the information comprising actively running processes of the first virtual machine and the second virtual machine; and
presenting a comparison tool for comparing the information between the first previous state and the second previous state of the virtual machine, wherein the comparison tool presents the actively running processes for the first previous state and the second previous state within a dialog box.

2. The method of claim 1 wherein the comparison tool is presented in a new window.

3. The method of claim 1, wherein the plurality of selectable states and the comparison tool are presented in a snapshot manager.

4. The method of claim 1, wherein the presenting the plurality of selectable states is performed during operation of the virtual machine in a first console.

5. The method of claim 1, wherein the information comprises performance analytics of the first previous state and the second previous state of the virtual machine.

6. The method of claim 1, wherein the information comprises running processes, installed applications, and file systems of the first previous state and the second previous state of the virtual machine.

7. The method of claim 1, wherein the information is selected from a list consisting of:
    running processes;
    installed applications;
    file systems;
    registry entries;
    environment variables;
    user management;
    open network ports; and
    virtual machine properties.

8. The method of claim 1, wherein information that is different between first previous state and the second previous state of the virtual machine is color coded.

9. A non-transitory computer readable storage medium having computer readable program code stored thereon for causing a computer system to perform a method for comparing states of a virtual machine, the method comprising:
    presenting a plurality of selectable states of a virtual machine within a snapshot viewer, the plurality of selectable states comprising a current state of a virtual machine, a first snapshot of a first previous state of the virtual machine and a second snapshot of a second previous state of the virtual machine;
    responsive to the selection of the first snapshot and the second snapshot:
        deploying a first virtual machine of the first snapshot for a first previous state of the virtual machine in a first console of a host computer system; and
        deploying a second virtual machine of the second snapshot for a second previous state of the virtual machine in a second console of the host computer system, such that the first console and the second console are concurrently active within the host computer system;
    responsive to deploying the first virtual machine and the second virtual machine, collecting information for use from the first virtual machine in the first console and the second virtual machine in the second console for use in comparing the first previous state to the second previous state, the information comprising actively running processes of the first virtual machine and the second virtual machine; and
    presenting a comparison tool for comparing the information between the first previous state and the second previous state of the virtual machine, wherein the comparison tool presents the actively running processes for the first previous state and the second previous state within a dialog box.

10. The non-transitory computer readable storage medium of claim 9, wherein the presenting the plurality of selectable states is performed during operation of the virtual machine in a first console.

11. A computer-implemented method for comparing states of a virtual machine, the method comprising:
    deploying the virtual machine in a first console of a host computer system;
    creating at least one snapshot of the virtual machine;
    during operation of the virtual machine in the first console, presenting a plurality of selectable states of a virtual machine within a snapshot viewer, the plurality of selectable states comprising a current state of the virtual machine and a snapshot of the virtual machine for selection in a snapshot manager of the virtual machine, wherein the snapshot comprises a previous state of the virtual machine;
    responsive to a selection of the current state of the virtual machine and the snapshot of the previous state of the virtual machine within the snapshot viewer, deploying a second virtual machine of the snapshot for the previous state of the virtual machine in a second console of the host computer system, such that the first console and the second console are concurrently active within the host computer system;
    collecting information for use from the virtual machine in the first console and the second virtual machine in the second console for use in comparing the current state to the previous state, the information comprising actively running processes of the virtual machine and the second virtual machine; and
    presenting a comparison tool in the snapshot manager for comparing the information between the current state and the previous state of the virtual machine, wherein the comparison tool presents the actively running processes for the current state and the previous state within a dialog box.

12. The method of claim 11, wherein the information comprises running processes, installed applications, and file systems of the current state and the previous state of the virtual machine.

* * * * *